3,037,041
COPPER COMPLEX OF DIMETHYL DITHIOCARBAMIC ACID AND PREPARATION THEREOF

André Couillaud, Rosny-sous-Bois, France, and Jean Racine, deceased, late of Paris, France, by Juliette Germaine Gabrielle Donnay Racine, legal representative, Paris, France, assignors to Roussel-UCLAF Societe Anonyme, Paris, France
No Drawing. Filed Oct. 10, 1960, Ser. No. 61,771
Claims priority, application France Oct. 26, 1959
5 Claims. (Cl. 260—438)

The present invention relates to a novel cuprous complex of dimethyldithiocarbamic acid having the approximate empirical formula $C_3H_6NS_2Cu \cdot CuCl$ and a copper content of 44.5 to 45% by weight. The invention also relates to a method of preparing said copper complex. The invention further relates to a method of destroying fungi which cause diseases in plants.

In the copending, commonly assigned United States application Serial No. 760,574, filed September 12, 1958, there is described and claimed a fungicidal copper complex of dimethyldithiocarbamic acid having the approximate empirical formula $C_3H_6NS_2Cu \cdot 2CuCl$ and a copper content of 48 to 50% by weight. The copper complex of the present invention not only possesses very high fungicidal activity but also is very stable and resists aging.

It is an object of the invention to obtain a novel, stable copper complex of dimethyldithiocarbamic acid having the approximate empirical formula $C_3H_6NS_2Cu \cdot CuCl$ and a copper content of 44.5% to 45% by weight.

It is a further object of the invention to prepare a copper complex of dimethyldithiocarbamic acid by a novel process.

It is another object of the invention to provide a simple, effective method of treating fungal infections of plants.

These and other objects and advantages of the invention will become more obvious from the following detailed description.

The process of the invention comprises reacting a stoichiometric quantity of an aqueous solution of cuprous chloride with an aqueous solution of an alkali metal or alkaline earth metal salt of dimethyldithiocarbamic acid at a temperature between 10° and 100° C., preferably between about 50° and about 80° C. to obtain the desired complex having the formula $C_3H_6NS_2Cu \cdot CuCl$. The reaction is effected in the presence of an alkali metal bisulfite to prevent the oxidation of the cuprous derivatives to the cupric state.

After the double decomposition is effected, the precipitate of the complex formed may be filtered, washed with bisulfite water and then with water until the wash water is free of chloride ions. After drying, the complex should contain 44.5 to 45% copper and 12.5 to 13% chlorine.

The reaction may be conducted in a homogeneous or a heterogeneous medium. Also, it is not essential that all the cuprous chloride be dissolved in the aqueous solution. It may be merely suspended in the aqueous solvent. Also, an alkali metal chloride may be added to the cuprous chloride solution.

In order to apply the fungicidal complex to plants, the complex may be mixed with a carrier to form a powder or liquid composition. If it is desired to apply the complex as a powder, the complex may be mixed with finely divided carriers such as lignosulfonates, dinaphthyl methane sulfonates, clay, natural silicates, and others. If it is desired to apply the complex in the liquid form, it may be dispersed in oils to form an emulsion or suspension, or it may be suspended in water.

In the following examples there are described several preferred embodiments to illustrate the invention. However, it should be understood that the invention is not intended to be limited to the specific embodiments.

EXAMPLE 1

*Preparation of the Cuprous Complex of Dimethyldithiocarbamic Acid*

There was dissolved with agitation at a temperature of about 20–30° C.:

500 gms. of sodium chloride
75 cc. of 35° Bé. sodium bisulfite
215 gms. of ground cuprous chloride in 2500 cc. of water The temperature of the thus prepared solution was raised to between 50 and 80° C. and 470 gms. of a 30% solution of sodium dimethyldithiocarbamate were introduced with agitation over a period of 15 to 30 minutes. The solution of sodium dimethyldithiocarbamate was diluted by a solution of 100 gms. of sodium chloride in 1000 cc. of water. The reaction was continued at the chosen temperature for about one hour. If required, the time of addition may be modified from several minutes to one hour, and the reaction time may also be modified without departing from the body of the invention. The precipitate was then filtered, washed with aqueous sodium bisulfite in order to eliminate the excess cuprous chloride, then with water until the wash water was free from soluble chlorides.

The product obtained may be treated by classic formulation procedures in order to obtain a wettable powder or a paste or an emulsion.

EXAMPLE 2

The product can be also prepared by working in a heterogenic medium. For 1 gm. mol of sodium dimethyldithiocarbamate, being 143.2 gms. of pure salt, the following mixture was placed in a flask having a means of mechanical agitation:

1000 cc. of water
25–50 cc. of 35° Bé. sodium bisulfite
50–100 gm. of sodium chloride
215 gm. of ground cuprous chloride Only a part of the cuprous chloride which permits the start of the reaction was dissolved when the sodium dimethyldithiocarbamate was introduced in the same fashion as in Example 1. As the precipitate was formed, the cuprous chloride continued to dissolve, allowing the reaction to proceed.

The resistance to aging of the present product was shown by proceeding in the absence of further formulation in the following manner:

About 2 gms. of the powder to be tested were placed in a cellophane package which was closed by folding. The package was placed in a water saturated atmosphere at 65° C. for 24 hours. At the end of this time it was placed in a dry atmosphere at 65° C. for the same time. After this the presence of free copper derivatives was tested by use of acidified potassium iodide. The cycle of alternate steaming and drying was followed until a positive reaction was obtained with starch paste.

Following this procedure, the 48 to 50% copper-containing products previously referred to gave a positive reaction after 1 to 4 steaming cycles. The compounds according to the invention were resistant to 10 to 20 successive cycles.

*Analysis.*—$(CH_3)_2NCSSCu \cdot CuCl$; molecular weight = 282.76. Calculated: Cu, 44.94%; Cl, 12.53%. Found: Cu, 44.8–45%; Cl, 12.5–13%.

Comparative Tests for the Determination of Antifungal Activity

The antifungal activity of the product of the invention $(CH_3)_2NCSSCu \cdot CuCl$ was determined with reference to mildew of the grapevine (*Plasmopara viticola*) on the leaves of the vine isolated and kept alive according to the method described below.

Lots of 10 leaves of the vine of the same variety were prepared as similar as possible with regard to age and size in the rate of one lot per product and per concentration to be tested plus as many of the lots as were needed in order to effect inoculation, these last serving as controls of the virulence of the strain of *Plasmopara viticola*.

On the first day suspensions of the product to be tested in the desired concentrations were sprinkled at a rate of 0.5 ml. per 75 cm.² on the surface of the foliage. After drying and 24 hours had elapsed, the leaves were inoculated by sprinkling the conidium of *Plasmopara viticola* freshly collected in twice distilled water. The next day following this inoculation and the two days thereafter, a sprinkling of twice distilled water at a pH of 7 was made for 5 minutes to serve as artificial rain.

24 hours after the last sprinkling of water, a new inoculation was effected by sprinkling with the conidium of *Plasmopara viticola* freshly collected. The 3 days following, water was sprinkled as already described above.

If it is desired, a third and a fourth inoculation with artificial rain in the intervals could be made. During the course of these various operations, the evolution of the infestation was followed by noting the leaves on which spots of mildew were present or not.

The results obtained were tabulated in the following table where there is also noted those of two control antifungicides:

A. Ethylene-bis-dithiocarbamate of zinc.
B. Mixture of ethylene-bis-dithiocarbamate of zinc and of cupric oxychloride.
C. The compound made according to the invention.

The three materials were tested at a concentration of 0.05% in suspension in water.

Following the examination of this table, it can be easily seen that the new product possesses a very good anti-fungal activity.

RESULTS OF COMPARATIVE TESTS OF DETERMINATION OF ANTIFUNGAL ACTIVITY

| Observations Effected: | Analysis of the Leaves During the Course of the Testing | | |
|---|---|---|---|
| | A | B | C |
| 3rd day following the 2nd inoculation | $10L=0$ | $10L=0$ | $10L=0$ |
| 3rd day following the 3rd inoculation | $\begin{cases}2L=10t\\2L=20t\\6L=30t\end{cases}$ | $\begin{cases}8L=0\\2L=1t\end{cases}$ | $\}10L=0$ |
| 3rd day following the 4th inoculation | $\begin{cases}3L=20t\\3L=50t\\4L=T\end{cases}$ | $\begin{cases}9L=3t\\1L=5t\end{cases}$ | $\begin{cases}9L=0\\1L=3t\end{cases}$ |
| 7th day following the 4th inoculation | $\begin{cases}1L=30t\\9L=T\end{cases}$ | $\begin{cases}5L=3t\\4L=5t\\1L=10t\end{cases}$ | $\begin{cases}6L=0\\4L=3t\end{cases}$ |

$L$ = leaf or leaves.
$0$ = no inoculation.
$t$ = number of small spots corresponding to a start of the development of mildew.
$T$ = leaf totally overrun.

Various modifications of the process and the products of the invention may be made without departing from the spirit or scope thereof, and it is to be understood that the invention is limited only as defined in the appended claims.

We claim:
1. The cuprous complex of dimethyldithiocarbamic acid containing between 44.5% and 45% by weight of copper and having the approximate empirical formula $C_3H_6NS_2Cu \cdot CuCl$ produced by the reaction of a salt of dimethyldithiocarbamic acid selected from the group consisting of alkali metal salt and alkaline earth metal salt with about a stoichiometric amount of cuprous chloride in the presence of an alkali metal bisulfite at temperatures between 10° and 100° C.

2. A process for the production of a cuprous complex of dimethyldithiocarbamic acid containing between 44.5% and 45% by weight of copper and having the approximate empirical formula $C_3H_6NS_2Cu \cdot CuCl$ which comprises reacting at a temperature between 10° and 100° C. a salt of dimethyldithiocarbamic acid selected from the group consisting of an alkali metal salt and an alkaline earth metal salt with a solution of about a stoichiometric amount of cuprous chloride in the presence of an alkali metal besulfite and recovering the said complex.

3. The process of claim 2 wherein the reaction is effected in the additional presence of sodium chloride.

4. The process of claim 2 wherein the alkali metal bisuilite is sodium bisulfite.

5. The process of claim 2 wherein the reaction media is heterogeneous.

References Cited in the file of this patent

UNITED STATES PATENTS

| | | |
|---|---|---|
| Re. 20,750 | Tisdale | Apr. 30, 1946 |
| Re. 20,869 | Bousquet | Oct. 4, 1938 |
| 1,972,961 | Tisdale et al. | Sept. 11, 1934 |
| 2,444,660 | Mathes | July 6, 1948 |
| 2,472,424 | Hoover | June 7, 1949 |
| 2,492,314 | Olin et al. | Dec. 27, 1949 |
| 2,762,822 | Vagenius | Sept. 11, 1956 |
| 2,854,467 | Harman | Sept. 30, 1958 |